(12) United States Patent
Burgdorf et al.

(10) Patent No.: US 6,755,112 B2
(45) Date of Patent: Jun. 29, 2004

(54) VEHICLE BRAKING SYSTEM WITH A PNEUMATIC BRAKE BOOSTER

(75) Inventors: Jochen Burgdorf, Offenbach (DE); Peter Drott, Frankfurt/M. (DE); Peter Volz, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/239,285

(22) PCT Filed: Mar. 15, 2001

(86) PCT No.: PCT/EP01/02926

§ 371 (c)(1),
(2), (4) Date: Sep. 20, 2002

(87) PCT Pub. No.: WO01/70551

PCT Pub. Date: Sep. 27, 2001

(65) Prior Publication Data

US 2003/0052534 A1 Mar. 20, 2003

(30) Foreign Application Priority Data

Mar. 20, 2000  (DE) .......................................... 100 13 532
Jun. 9, 2000    (DE) .......................................... 100 28 691

(51) Int. Cl.$^7$ .............................. F01B 25/26; F15B 9/10
(52) U.S. Cl. ............................................. 91/1; 91/369.2
(58) Field of Search ........................... 91/369.2, 376 R, 91/1; 92/5 R

(56) References Cited

U.S. PATENT DOCUMENTS

| | | |
|---|---|---|
| 5,372,409 A | 12/1994 | Farr |
| 5,842,751 A | 12/1998 | Unterforsthuber |
| 5,873,247 A | 2/1999 | Schlüter et al. |
| 6,318,815 B1 | 11/2001 | Haupt et al. |
| 6,334,383 B1 | 1/2002 | Tsubouchi et al. |
| 2001/0002767 A1 | 6/2001 | Dieringer et al. |

FOREIGN PATENT DOCUMENTS

| | | |
|---|---|---|
| DE | 44 32 583 | 9/1995 |
| DE | 195 25 985 | 1/1997 |
| DE | 199 16 919 | 1/2000 |
| DE | 198 25 110 | 2/2000 |
| EP | 0 379 329 | 7/1990 |
| EP | 0 754 607 | 1/1997 |
| WO | WO 98/35867 | 8/1998 |
| WO | WO 99/30944 | 6/1999 |
| WO | WO 99/38741 | 8/1999 |

OTHER PUBLICATIONS

International Search Report of PCT/EP01/02926 dated Jul. 31, 2001.
German Search Report dated Oct. 31, 2000.

*Primary Examiner*—Edward K. Look
*Assistant Examiner*—Michael Leslie
(74) *Attorney, Agent, or Firm*—RatnerPrestia

(57) ABSTRACT

The present invention relates to a vehicle brake system with a pneumatic brake booster which includes an input member being actuated by a vehicle operator and an output member as well as a control housing that carries a movable wall and accommodates a reaction plate at least in part, wherein there is further provision of means for detecting the point of maximum boosting of the pneumatic brake booster that can be used for the actuation of another brake force boosting device.

The core of the present invention lies in that a switching or sensor means is provided with senses the maximum boosting force on the basis of a maximum deformation of a reaction element that is indirectly arranged between an output element and a movable wall in that the maximum approach between the output member representative of the output force and the movable wall representative of the booster force is sensed. Further, appropriate means sense the hold time during which the mentioned signal is applied. Only when the signal is applied during the total hold time, a signal reporting the point of maximum boosting is output.

17 Claims, 5 Drawing Sheets

VEHICLE BRAKING SYSTEM WITH A PNEUMATIC BRAKE BOOSTER

This application is a U.S. national-phase application of PCT International Application No. PCT/EP01/02926 filed Mar. 15, 2000.

TECHNICAL FIELD

The present invention relates to a vehicle braking system with a pneumatic brake booster which includes an input member being actuated by a vehicle operator and an output member (push rod), as well as a control housing that carries a movable wall and accommodates a reaction plate at least in part, wherein there is further provision of means for detecting the point of maximum boosting of the pneumatic brake booster that can be used for the actuation of another brake force boosting device.

BACKGROUND OF THE INVENTION

A braking system of this type is disclosed in EP 754 607 A2 and comprises effective means for detecting the point of maximum boosting of the pneumatic brake booster as well as an additional boosting device that can be activated by virtue of the means of detection when the point of maximum boosting of the pneumatic brake booster is reached. The means for detecting the point of maximum boosting comprises a pneumatic pressure switch and an electric (contact) switch in the area of a reaction plate, which latter switch includes two opposed contacts on the reaction plate and a conducting path on a valve piston. An electric evaluation unit detects the point of maximum boosting in the case that both switches are actuated, i.e., electrically closed.

The known method is intricate because there are two switches and the evaluation of the signals of the switches. Not only is increased effort and structure incurred thereby with respect to the calibration of the two switches, but there are also additional expenditures in hardware.

Also, each cable must be led out of the interior of the brake booster in a fluid-tight manner and conducted to an electric control unit. The implementation of this system further necessitates evaluation software that takes two switches into account. One single switch in the area of the reaction plate will not solve this task because the actuation of the brake booster causes a contact between the valve piston and the reaction plate, without the point of maximum boosting being automatically reached.

One single pneumatic switch or sensor for sensing the pneumatic pressure in the chamber of variable pressure (working chamber) is unfavorable because in the event of the ventilation channel being clogged, for example, the boosting force will develop only very slowly or not at all. Because the pneumatic switch is consequently not actuated, the defect will not be detected although the vehicle operator requests an increased boosting force. Therefore, no signal can be produced for the activation of an additional auxiliary force source.

An object of the present invention is to provide a simplified and, additionally, improved brake system with a detection of the point of maximum boosting which outputs a corresponding signal, even in cases in which the pneumatic brake booster does not supply the requested boosting force.

This object is achieved, along with the features of the characterizing portion of patent claim 1, in that a switching or sensor means is provided which senses a maximum approach above a switching threshold between a component of the brake booster representative of the input force (Fe), especially an input member, and a component of the brake booster representative of the boosting force (Fv), especially a movable wall or a component connected thereto, and wherein there is provision of means to detect the hold time so that the time interval during which the maximum approach which occurs between the two components that are movable relative to one another can be determined, and a signal reporting the point of maximum boosting will only be output after expiry of a predefined time interval.

The approach between the input member (valve piston) and a control housing that carries the movable wall is sensed in another embodiment of the present invention.

Further, it is favorable to arrange for a slot in the area between the valve piston and the control housing, the slot decreasing with increasing boosting force of the brake booster. It is advisable to take a completely used-up or at least greatly reduced slot (an abutment between valve piston and control housing in the area of the switch-sensor) into account for sensing the point of maximum boosting. Accordingly, the switch/sensor with its actuating element must be integrated into the control housing or the valve piston.

It will be appreciated that the electric signals of the switch/sensor are sent to an electric control unit by way of a fluid-tight cable connection. Preferably, the control unit concerns an electric control unit of an ABS control system, e.g. with driving dynamics control functions, or an electric control unit of an independently operable, preferably electromagnetically operable, brake booster. Control units of this type are already provided in almost all modern vehicles so that the expenditure in hardware for the control unit is further reduced.

It is also favorable to employ a micro switch with especially small dimensions to save mounting space.

According to the characterizing portion of an alternative independent patent claim, the object of the present invention is achieved by the provision of a switching or sensor means which senses the maximum boosting force on the basis of a maximum deformation of a reaction element that is indirectly arranged between an output element (push rod) and a movable wall in that the maximum approach between the output member representative of the output force (Fa) and the movable wall representative of the booster force (Fv) is sensed.

According to the characterizing portion of another independent patent claim, the object of the present invention is achieved in that a switching or sensor means is provided which senses the maximum booster force (Fv) on the basis of a maximum deformation of a reaction element that is indirectly arranged between output element and input element in that the maximum approach between an output member representative of the output force (Fa) and an input member representative of the input force (Fe) is sensed.

A major advantage of the present invention includes that the point of maximum boosting is determined directly in the range of the differential forces to be compared, without the need to arrange for two switches or sensors and, more particularly, without the necessity of a pneumatic pressure sensor.

Further advantageous embodiments of the present invention can be taken from the sub claims in connection with the description and the accompanying drawings.

DETAILED DESCRIPTION OF THE PREFERRED EMBODIMENTS

Figure 5:
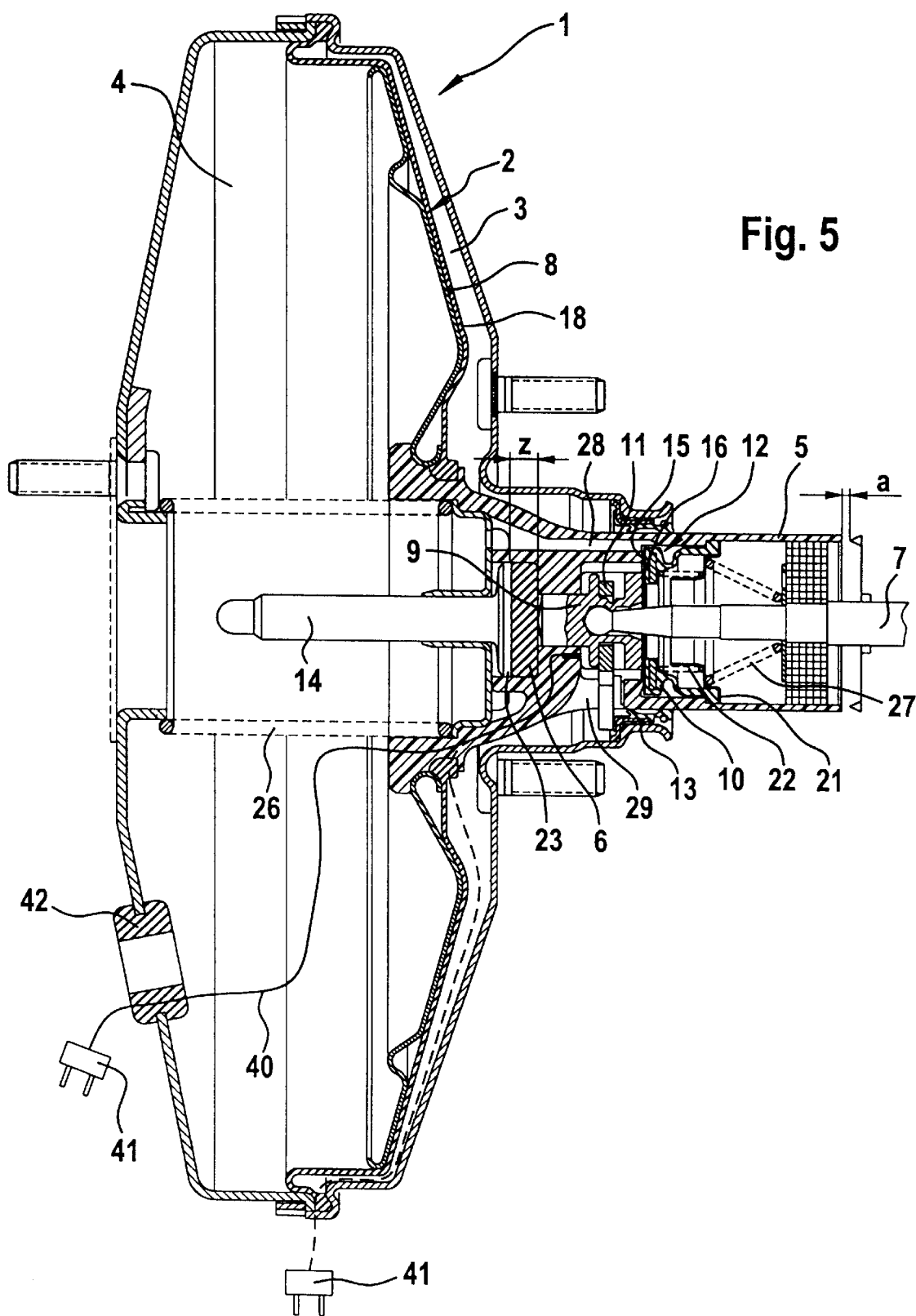
FIG. 5 is a partly schematic cross-section taken through a pneumatic brake booster, especially for clearly showing the electrical connection to the vehicle electronic system.

A booster housing 1 of a pneumatic brake booster, shown in FIG. 5, is subdivided into a working chamber 3 and a vacuum chamber 4 by an axially movable wall 2. The axially movable wall 2 is composed of a deep drawn sheet-metal diaphragm plate 8 and a flexible diaphragm 18 that abuts thereon and, as a rolling diaphragm (not shown) provides a sealing between the outside periphery of the diaphragm plate 8 and the booster housing 1.

A control valve 12 operable by an actuating rod 7 is accommodated in a control housing 5 that is sealed and guided in the booster housing 1 and carries the movable wall 2. Control valve 12 is comprised of a first sealing seat 15 designed at the control housing 5, a second sealing seat 16 designed at a valve piston 9 connected to the actuating rod 7, and a valve member 10 cooperating with the two sealing seats 15, 16 and being pressed against the valve seats 15, 16 by means of a valve spring 22 that is supported on a holding ring 21. Working chamber 3 is connectable to vacuum chamber 4 by way of a channel 28 that extends laterally in the control housing 5.

The brake force is transmitted to an actuated piston of a master cylinder (not shown) of the brake system by way of a rubber-elastic reaction plate 6 that frontally abuts on control housing 5 and a push rod 14 that includes a heat flange 23, the actuating piston being fitted at the vacuum-side end of the vacuum brake booster. The input force introduced at the actuating rod 7 is transmitted to the reaction plate 6 by means of valve piston 9.

A resetting spring 26 (shown schematically in the drawing) that is supported on a flange at the vacuum-side end wall of the booster housing 1 maintains the movable wall 2 in the illustrated initial position. Besides, a second compression spring 27 is provided between the actuating rod 7 and a prop ring that abuts on the holding ring 21 and secures the valve member 10 in position on the holding ring 21. The force of spring 27 ensures that the valve piston 9 or, respectively, its valve seat 16, is preloaded in relation to the valve member 10.

To permit connection of the working chamber 3 to the atmosphere when the control valve 12 is actuated, a channel 29 that extends roughly in a radial direction is designed in the control housing 5. The return movement of the valve piston 9 at the end of a braking action is limited by a transverse member 11 which abuts on a slide ring seal 13 that seals and guides the control housing 5 in the booster housing 1 in the release position of the vacuum brake booster as shown in the drawing.

As is further depicted in FIG. 5, the valve member 10 includes an annular sealing surface that interacts with the two sealing seats 15, 16 and is reinforced by means of a metallic reinforcing disc.

During brake operation and with the boosting force developing, the movable wall 2 carried by the control housing 5 displaces in the direction of the housing part close to the master cylinder. The position of the movable wall 2 is, thus, representative for the portion of the boosting force generated by the booster. On the other hand, the position of the input member (actuating rod 7) directly represents the driver's demand. This interrelation is utilized in the solutions according to FIGS. 1 and 2 to sense the point of maximum boosting with simple means. In other words, a maximum approach of the input member (actuating rod 7) in relation to the movable wall 2 is taken into account as an indicator for the point of maximum boosting. The maximum length of immersion of the input member into the control housing 5 may be taken into account as an indicator in the same manner, which provides for advantages in terms of space in regards to the arrangement of the necessary switch or sensor in the control housing 5.

Figure 1:
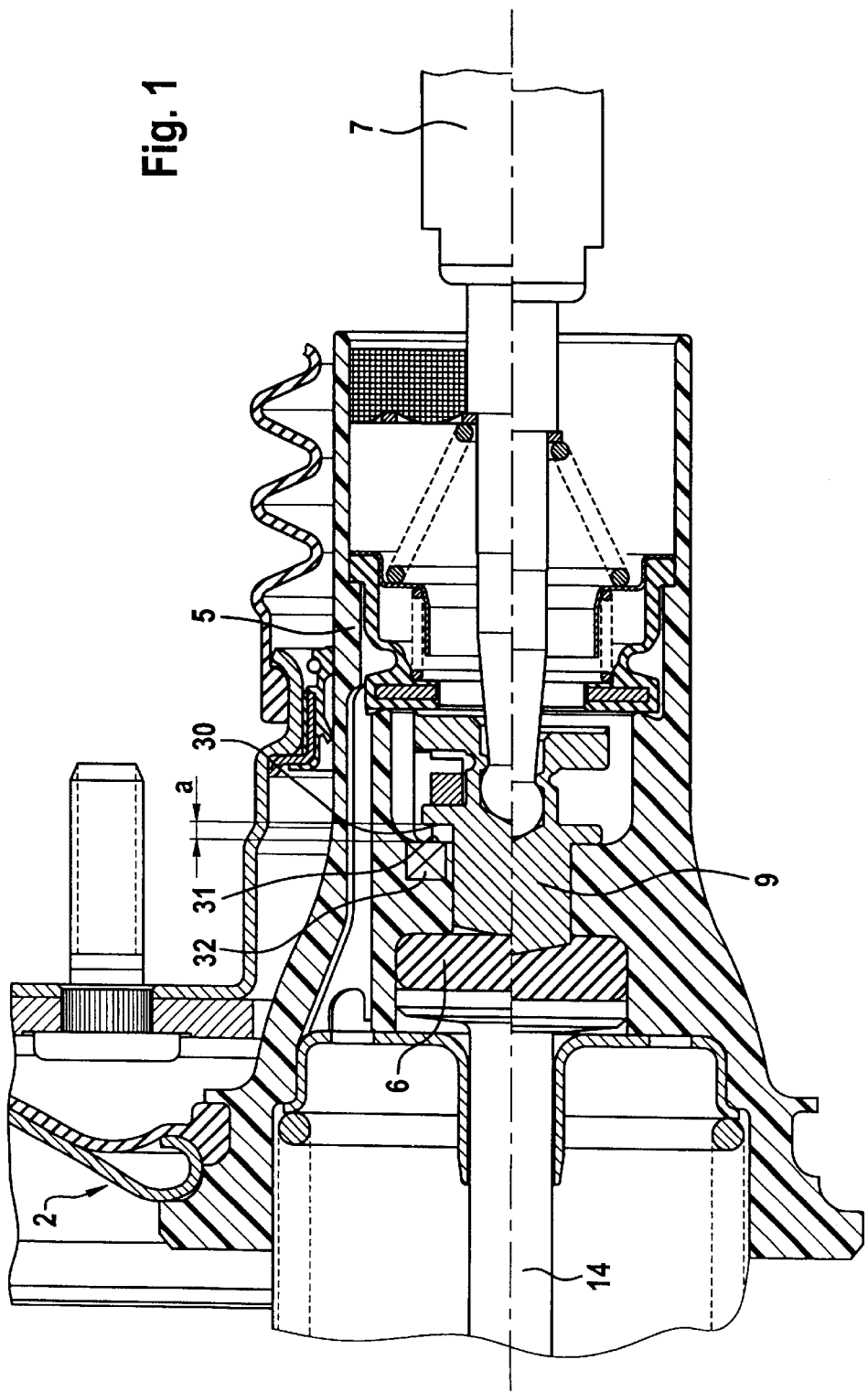
FIG. 1 is a partial cross-sectional view of a principal illustration of the present invention by way of a pneumatic brake booster in its basic position in the top half of the drawing and in the point of maximum boosting in the bottom half of the drawing.

In the solution according to FIG. 1, too, the valve piston 9 at the end of the actuating rod 7 in its front area includes a radial flange-type extension with an abutment surface 30 (first reference surface) which, in an initial position, is at a distance a from an abutment surface 31 (second reference surface) close to the control housing. The distance "a" in this arrangement is chosen to be so large that the slot in the point of maximum boosting is used up or at least essentially reduced so that there is an approach of the valve piston abutment surface 30 with respect to the control housing abutment surface 31. It is possible in another embodiment of the present invention to arrange for an electric key button or switch 32 with an actuating element that is integrated in the control housing 5. The actuating element will respond to the approach of the valve piston 9 so that after the approach happened, a signal reporting the point of maximum boosting can be generated. Any description or detailed drawing relating to the possibility of arrangement of the switch or sensor is consciously omitted in this respect, because many arrangement variations are known to one skilled in the art, without departing from the spirit of the present invention. Only as an example in a kinematic reversal, it is basically possible to integrate the switch or sensor with its actuating element into the valve piston 9 and to move it along with the valve piston 9, with a signal being produced when the valve piston 9 with its extension and together with the switch is moved to bear against the abutment surface 31 on the side of the control housing 5.

It applies to all solutions that principally sensors, in particular Hall sensors, will be preferred over electric switches. The reason for this is that sensors allow an automatic calibration in order to define a fixed reference point of the device, e.g., in the non-actuated condition. This is done, for example, when the ignition is switched on, or with each brake application, and renders possible a tolerance-independent, clear allocation of a switching condition to a determined condition of booster actuation (relative position of defined components), even after many years of service and related wear. In contrast thereto, switches are more sensitive to tolerances because an installation position that is exactly conformed to the tolerance position must be safeguarded in order that a defined switching condition of the switch is associated with a defined actuating condition of the brake booster.

Means for detecting the hold time of the maximum approach can be provided in all solutions so that a signal reporting the point of maximum boosting will not be generated until after expiry of a predefined time interval during which the maximum approach prevails.

The means can be implemented as a time element into an electric control unit, for example, in the way of an algorithm, so that additional hardware is not absolutely necessary. It is advisable to, e.g., define 300 milliseconds as the hold time so that a signal of maximum boosting will only be emitted when a signal with respect to the defined time is applied to the switch/sensor.

The following additional explanations can be given with respect to the use of the hold member. In the solutions according to FIGS. 1, 2, and 4, the relative position between the input member 7 and the control housing 5 is decisive for the evaluation of whether the booster is at the point of maximum boosting. The aim is that the additional boosting, e.g. by an ABS pump, is activated when the brake booster provides its maximally attainable boosting force. This means that an increase of the force that acts on the master cylinder connected after the booster is no longer assisted by the brake booster but must be generated additionally by the driver by application of the pedal. This is because the driver demands additional brake force in this case which the booster is unable to provide because it either provides its maximally attainable boosting force, or, the booster is defective. It has been explained hereinabove that this boost condition can be detected by a slot between control housing 5 and input member 7 falling below a defined value, or the input member moving to bear against the control housing. If, however, the slot provided in a brake booster for its normal operation is sufficiently small, one has a correspondingly short lost travel for the pedal in order to switch from the normal operation into the condition where the input member is in abutment with respect to the control housing so that it is possible to act with the pedal, by way of the control housing, directly upon the push rod of the master cylinder. It is desired in this condition to activate the additional brake force to provide the driver with the assistance he/she no longer gets from the brake booster.

In the event of a small slot provided for normal operation, however, it may occur that this small slot is overcome by a sufficiently vigorous application of the pedal by the driver already during the normal function of the brake booster. This is because the driver, with a powerful movement, will displace the input member 9 with respect to the control housing 5 sufficiently far until it abuts. Since a valve is opened with this movement, however, by means of which the pressure of the atmosphere has access to the working chamber 3 of the booster, the movable wall 2 and, thus, the control housing 5 will follow the input member 9, with the result that the slot increases again. In the point of maximum boosting of the booster, the input member 9, in contrast thereto, will stay in abutment with respect to the control housing 5 for as long, as the driver demands additional brake force and, accordingly, acts upon the input member 9. Therefore, the time element renders it possible to distinguish, in the event of a small slot, whether the driver has acted on the input member 9 quite intensely for a short time in the normal functional range of the brake booster, or whether the brake booster is already at its point of maximum boosting.

If, however, the slot is made large enough, the need for time measurement may be obviated under certain circumstances. In this case, it will not occur that the driver acts upon input member 9 into abutment outside the working range of the brake booster that lies outside the point of maximum boosting because, in a normal braking operation, the force of the driver is not sufficient for this purpose and the control housing 5 will immediately follow the input member 9 so that the stop is not reached during normal operation. Only when the brake booster is at the point of maximum boosting is the driver able (with the necessary considerable force effort) to have the input member 9 plunge sufficiently far into the reaction plate 6 until the input member 9 has moved into abutment with the control housing 5. In other words, it depends on the size of the slot in normal operation whether the use of a time measuring device is necessary to make a distinction between the normal range and the point of maximum boosting of the brake booster.

The above statements correspondingly apply also if the actuation of the switch 32 prior to the stop rather than the reaching of the stop is decisive for triggering the auxiliary force.

Figure 2:
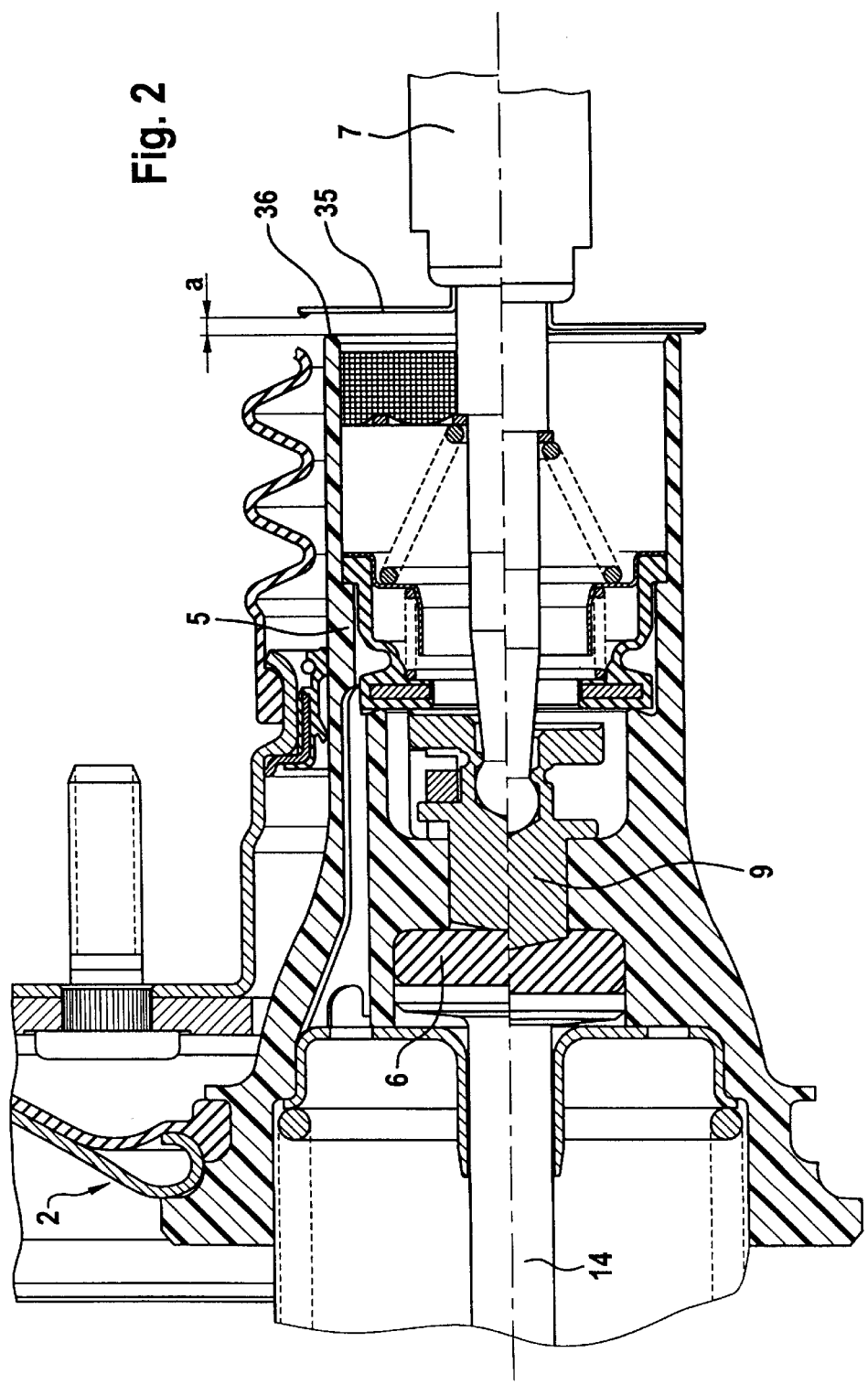
FIG. 2 is a second variation in an illustration as in FIG. 1.

A modified embodiment can be taken from FIG. 2, and corresponding components and features have been designated by like reference numerals. FIG. 2 differs from the solution of FIG. 1 in that the approach is not monitored within the control housing 5 but quasi outside between an abutment member 35 and an end surface 36 of a tubular collar of control housing 5. It is self-explanatory that an integral step may be arranged at the actuating rod 7 instead of the separate abutment member 35. As has been described in the solution in FIG. 1, the switch/sensor may be arranged on the control housing 5 or on the valve piston 9, depending on the kinematic preference.

Figure 3:
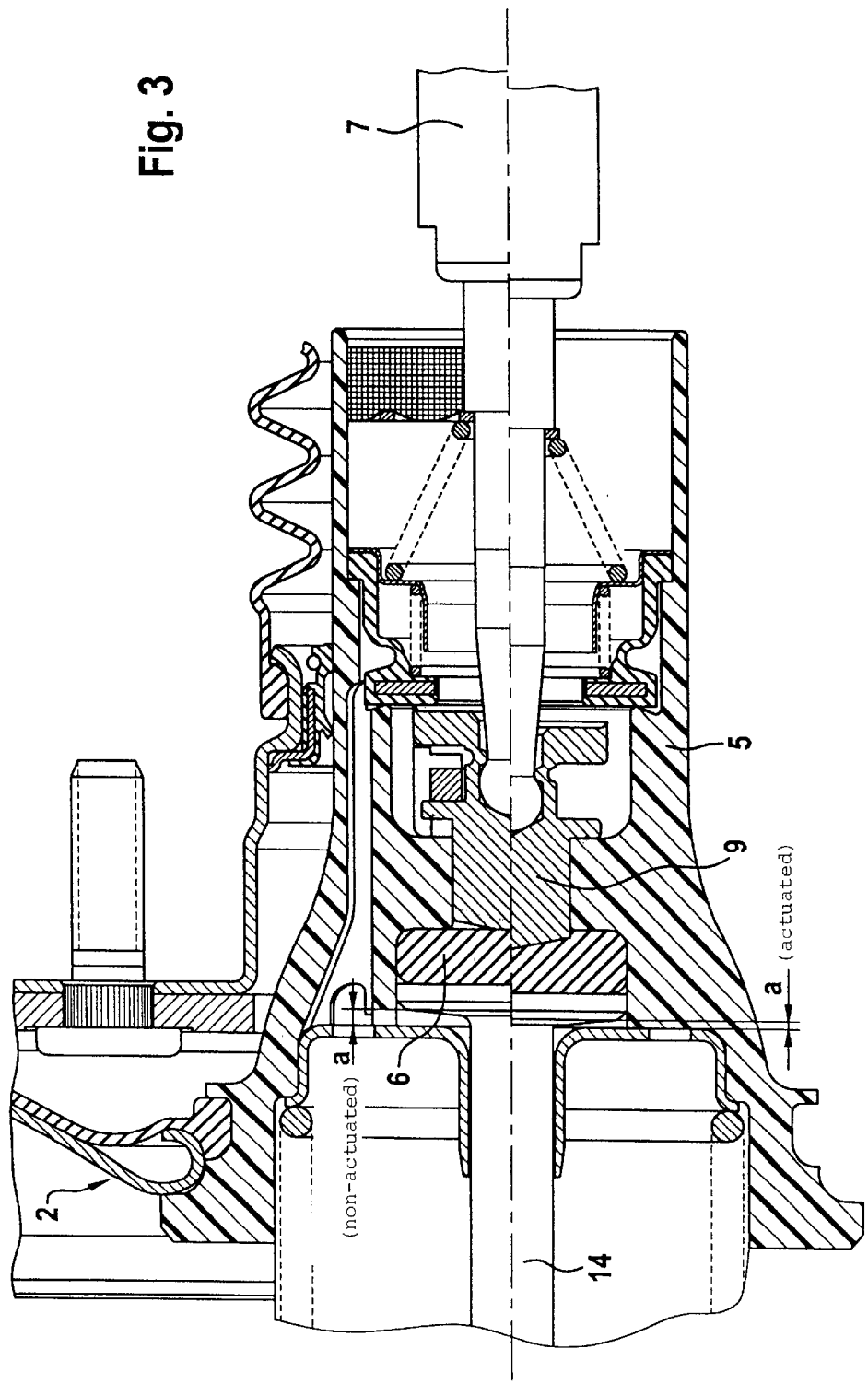
FIG. 3 is another principal solution in an illustration as in FIG. 1.

FIG. 3 relates to another solution that is independent of FIGS. 1 and 2 and is also based on the principle of the direct sensing of a relative displacement on the side of the reaction plate 6 remote from the valve piston 9. Like before, like reference numerals are used for designating like features.

The relative displacement is sensed between the output member (push rod 14) and quasi indirectly the movable wall 2, more specifically, between the push rod 14 and the control housing 5 that carries the movable wall 2 and partly accommodates the reaction plate 6. In a fashion that is basically similar to the solution according to FIGS. 1 and 2, shortening of the slot between the push rod 14 and the control housing 5 is used for sensing the point of maximum boosting. This solution is advantageous because the mounting space for the electric switch is shifted into an area of the brake booster where the vacuum chamber 4 provides for sufficient mounting space. Especially, there is no lack in space that is given in a control housing 5 due to the duct arrangement.

Figure 4:
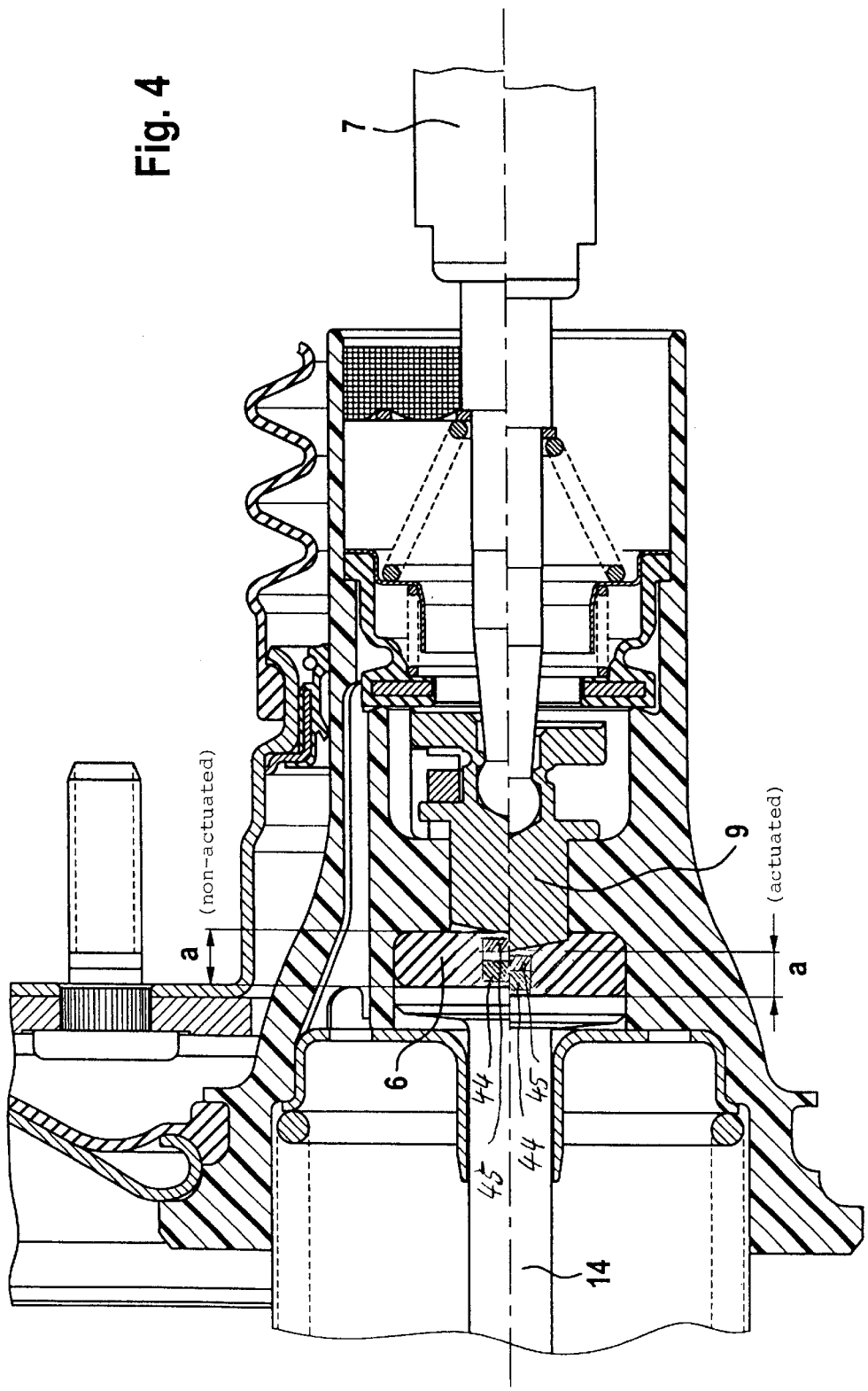
FIG. 4 is still another solution in an illustration as in FIG. 1.

In the solution of FIG. 4, a relative travel between the input member (valve piston 9) and the output member (push rod 14) is sensed. This displacement is due to a deformation of the reaction plate 6 due to prevailing reaction forces. Because high brake forces and, consequently, high reaction forces cause a reduction of the size of the reaction plate 6, the shortening of a distance between two reference points or reference levels of two different components that lie in the flux of force is used to recognize the point of maximum boosting. As in the solution according to FIGS. 1 and 2, it is necessary to monitor the period of time of the maximum approach between the two input and output members that are moved in relation to each other (hold time). It is thereby ensured that a detection signal of the point of maximum boosting is emitted only when the maximum relative displacement (approach) lasts longer than 300 milliseconds, for example. A so-called depression of the pedal through its full travel, e.g. in consequence of a panic stop, may lead to a great relative displacement for a short period of time. Thus, such a depression is clearly distinguished from a point of maximum boosting or a defect of the booster. In other words, the risk of spurious releases is reduced, although only one single switch or sensor is employed.

It is clear that necessary calculating operations are implemented and performed by way of algorithms in control electronics, which is of course effected in correspondingly provided data processing units.

It is indicated in FIG. 4 that the switch contact can also be inserted into the reaction element 6. To render this fact more clear, contacts 45, 44 consisting of a conductive material are indicated in FIG. 4. When the contacts get into touch with each other, a current circuit (not illustrated) will be closed, which corresponds to a respective release signal for the auxiliary force to be provided. The contacts may also be designed in any other fashion. For example, contact 45 may be connected integrally to the valve piston 9. The same applies to output member 14 with respect to contact 44. However, care must be taken that the contacts are not connected by being grounded or earthed when switches 44, 45 are open. Also, there must be free space between the contacts so that they can touch each other.

It is further self-explanatory with respect to all solutions that the electric signals of the switch-sensor are sent to the electric control unit (not shown) by way of a fluid-tight cable connection 40. Principally, the unit may be arranged at any desired location in a vehicle, for example, inside the engine compartment or inside the vehicle interior. For the connection to a so-called fly-lead provided on a vehicle or for a direct connection to the electric control unit, a cable connection 40 with a plug 41 may be provided at the booster. The arrangement of the cable connection 40 is illustrated schematically in FIG. 5. It is possible, according to a variation, to efficiently arrange the cable in the area of a housing passage 42 (for a cable/vacuum connection) that is already provided, and to have the cable extend through chamber 4. According to another variation, the cable is led out in the area of lanced indentations of a housing and applied to the diaphragm in the housing interior. It is advisable for both cases to injection-mold at least part of the cable tree 40 in a part of the control housing 5 (made of plastics). Finally, at least parts of the actuating rod 7 and/or the valve piston 9 may be arranged additionally as electric conductors for the signal transmission, especially in a solution (similar to FIG. 2) with contacts provided outside.

Instead of leading the contacts via conduits 40 out of the housing of the brake booster 1, this may be effected also without conduits by means of a non-illustrated radio link (telemetry). Instead of measuring a distance or travel, it may be advisable within the context of the present invention to measure the differential of the travel in order to detect the point of maximum boosting of the brake booster. This is because if the brake booster reaches its point of maximum boosting, the input member 7 or the valve piston 9, respectively, will be immersed into the reaction element 6 until the valve piston 9 abuts on the control housing. Starting from this point of time, the total force of the master cylinder will counteract the leg force of the driver, causing a change of movement at the pedal and, thus, of the valve piston 9. The differential of the pedal travel will change accordingly.

The electric control unit preferably is an electric control unit of an ABS control system, especially with driving dynamics control functions, or an electric control unit of an independently operable, preferably electromagnetically operable, brake booster. Control units of this type are already provided in almost all modern vehicles so that the necessary hardware for the control unit is further reduced.

What is claimed is:

1. Vehicle brake system with a pneumatic brake booster comprising an input member being actuated by a vehicle operator and an output member as well as a control housing that carries a movable wall and accommodates a reaction plate at least in part, wherein there is further provision of means for detecting the point of maximum boosting of the pneumatic brake booster that can be used for the actuation of another brake force boosting device,
   wherein one single switching or sensor means is provided which senses a maximum approach above a switching threshold between the input member of the brake booster representative of the input force, and the movable wall of the brake booster representative of the boosting force, and wherein there is further provision of means to detect the hold time of the maximum approach so that a signal reporting the point of maximum boosting will only be generated after expiry of a predefined time interval during which the maximum approach occurs.

2. Brake system as claimed in claim 1, wherein the approach between the input member and a control housing carrying the movable wall is sensed.

3. Brake system as claimed in claim 1, wherein a slot is provided in an area between the input member and the control housing and the slot can be decreased with increasing boosting force of the brake booster, wherein a completely used up or at least minimized slot is taken into account for sensing the point of maximum boosting.

4. Brake system as claimed in claim 1, wherein the switching or sensor means with its actuating element is integrated into the control housing, or the input member, or into the reaction element.

5. Brake system as claimed in claim 1, wherein an electric control unit is provided, wherein electric signals of the switching or sensor means are sent to the control unit by way of a fluid-tight cable connection.

6. Brake system as claimed in claim 1, wherein a control unit for determining the point of maximum boosting is integrated into the housing of an ABS control system or of an electromagnetically operable brake booster.

7. Brake system as claimed in claim 1, wherein a micro switch for sensing the point of maximum boosting is provided.

8. Vehicle brake system with a pneumatic brake booster comprising an input member being actuated by a vehicle operator and an output member as well as a control housing that carries a movable wall and accommodates a reaction plate at least in part, wherein there is further provision of means for detecting the point of maximum boosting of the pneumatic brake booster that can be used for the actuation of another brake force boosting device,
   wherein a switching or sensor means is provided which senses the maximum boosting force on the basis of a maximum deformation of the reaction plate that is indirectly arranged between the output member and the movable wall in that the maximum approach between the output member representative of the output force and the movable wall representative of the booster force is sensed.

9. Brake system as claimed in claim 8, wherein the switching or sensor means with its actuating element is integrated into the control housing, or the input member, or into the reaction element.

10. Brake system as claimed in claim 8, wherein an electric control unit is provided, wherein electric signals of the switching or sensor means are sent to the control unit by way of a fluid-tight cable connection.

11. Brake system as claimed in claim 8, wherein a control unit for determining the point of maximum boosting is integrated into the housing of an ABS control system or of an electromagnetically operable brake booster.

12. Brake system as claimed in claim 8, wherein a micro switch for sensing the point of maximum boosting is provided.

13. Vehicle braking system with a pneumatic brake booster comprising an input member being actuated by a vehicle operator and an output member as well as a control housing that carries a movable wall and accommodates a reaction plate at least in part, wherein there is further provision of means for detecting the point of maximum boosting of the pneumatic brake booster that can be used for the actuation of another brake force boosting device, wherein a switching or sensor means is provided which senses the maximum boosting force on the basis of a maximum deformation of the reaction plate that is indirectly arranged between the output member and the input member in that the maximum approach between the output member representative of the output force and the input member representative of the input force is determined.

14. Brake system as claimed in claim 13, wherein the switching or sensor means with its actuating element is integrated into the control housing, or the input member, or into the reaction element.

15. Brake system as claimed in claim 13, wherein an electric control unit is provided, wherein electric signals of the switching or sensor means are sent to the control unit by way of a fluid-tight cable connection.

16. Brake system as claimed in claim 13, wherein a control unit for determining the point of maximum boosting is integrated into the housing of an ABS control system or of an electromagnetically operable brake booster.

17. Brake system as claimed in claim 13, wherein a micro switch for sensing the point of maximum boosting is provided.

* * * * *